(12) United States Patent
Sanders

(10) Patent No.: US 11,061,932 B2
(45) Date of Patent: Jul. 13, 2021

(54) METHODS AND SYSTEM FOR MANAGING STORAGE WITH MULTIPLE SIMULTANEOUS DATA TEMPERATURE MODELS

(71) Applicant: Teradata US, Inc., Englewood, OH (US)

(72) Inventor: Kevin Reed Sanders, Escondido, CA (US)

(73) Assignee: Teradata US, Inc., San Diego, CA (US)

( * ) Notice: Subject to any disclaimer, the term of this patent is extended or adjusted under 35 U.S.C. 154(b) by 188 days.

(21) Appl. No.: 16/515,554

(22) Filed: Jul. 18, 2019

(65) Prior Publication Data

US 2020/0110762 A1    Apr. 9, 2020

Related U.S. Application Data

(60) Provisional application No. 62/742,348, filed on Oct. 6, 2018.

(51) Int. Cl.
*G06F 16/28* (2019.01)
*G06F 9/50* (2006.01)
(Continued)

(52) U.S. Cl.
CPC .............. *G06F 16/283* (2019.01); *G06F 7/00* (2013.01); *G06F 9/5094* (2013.01);
(Continued)

(58) Field of Classification Search
CPC .. G06F 16/283; G06F 16/182; G06F 16/9035; G06F 9/5094; G06F 9/541; G06F 7/00
(Continued)

(56) References Cited

U.S. PATENT DOCUMENTS 7,844,581 B2    11/2010 Dubnicki et al.
9,851,923 B2 *  12/2017 Shank ..................... G06F 3/065
(Continued)

OTHER PUBLICATIONS

Hsu, Ying-Feng, et al., "A Novel Automated Cloud Storage Tiering System through Hot-Cold Data Classification", CLOUD 2018, San Francisco, CA, Jul. 2-7, 2018, pp. 492-499.*

(Continued)

*Primary Examiner* — Robert Stevens
(74) *Attorney, Agent, or Firm* — Schwegman, Lundberg & Woessner, P.A.

(57) ABSTRACT

A single storage allocation unit of a distributed storage is mapped to multiple different data temperature metric values (metric value), and each metric value calculated and produced by a data temperature generator. Each generator is designed to provide a metric value used to optimize performance of a specific data management feature for the storage subsystem. At any given point in time, the storage allocation unit has multiple up-to-date metric values available for managing the underlying data of the storage allocation unit by storage subsystems and storage management processes. Based on changing performance characteristics associated with the underlying data, a current metric value being used to manage the storage allocation unit can be dynamically switched to a different up-to-date metric value. This automatically causes the underlying storage subsystems/storage management processes to optimize arrangement and organization of the underlying data for a desired data management feature.

20 Claims, 4 Drawing Sheets

(51) Int. Cl.
  *G06F 16/182* (2019.01)
  *G06F 7/00* (2006.01)
  *G06F 16/9035* (2019.01)
  *G06F 9/54* (2006.01)
(52) U.S. Cl.
  CPC ........ *G06F 16/182* (2019.01); *G06F 16/9035* (2019.01); *G06F 9/541* (2013.01)
(58) Field of Classification Search
  USPC ........................................................ 707/600
  See application file for complete search history.

(56) References Cited

U.S. PATENT DOCUMENTS

| | | |
|---|---|---|
| 10,025,804 B2 | 7/2018 | Vranyes et al. |
| 10,078,668 B1 | 9/2018 | Woodrow et al. |
| 10,409,516 B1* | 9/2019 | Kushner ................. G06F 16/20 |
| 2010/0106615 A1 | 4/2010 | Chadwick et al. |
| 2015/0186046 A1* | 7/2015 | Benton ............... G06F 12/0866 |
| | | 711/103 |
| 2015/0317339 A1 | 11/2015 | Vranyes et al. |
| 2018/0004788 A1* | 1/2018 | Kumar ................ G06F 16/2282 |
| 2019/0356730 A1* | 11/2019 | Bivens ................ H04L 67/1002 |

OTHER PUBLICATIONS

Li, Wei, et al., "Data Temperature-Aware Bloom Filters for Flash-based Storage", HPCC/SmartCity/DSS 2019, Zhangjiajie, China, Aug. 10-12, 2019, pp. 1421-1428.*

* cited by examiner

METHODS AND SYSTEM FOR MANAGING STORAGE WITH MULTIPLE SIMULTANEOUS DATA TEMPERATURE MODELS

RELATED APPLICATIONS

The present application claims priority to and is a non-provisional of U.S. Provisional Application No. 62/742,348 filed on Oct. 6, 2018 and entitled: "Satisfying Conflicting Storage Optimization Goals Using Multiple Simultaneous Data Temperature," the disclosure of which is incorporated by reference herein in its entirety.

BACKGROUND

Data which is stored in a database is partitioned into a set of storage allocation units. Each of these units is identified by a name unique within the database system and which can be used to locate a particular storage allocation unit regardless of where it exists within the storage subsystem portion of the database. Database storage subsystems may contain a homogenous set of devices or may contain more than one storage tier. Within a single tier, the storage is homogenous, but different tiers will each hold different storage types. There is generally a performance difference between the different storage tiers, resulting in some storage tiers being faster or more capable than other tiers. Certain storage tiers may also exhibit different performance characteristics even within the storage tier. For example, Hard-Disk Drive (HDD) storage can vary in performance depending upon the location of the data on the rotating storage medium.

Existing temperature-aware storage subsystems maintain a temperature metric for each storage allocation unit or possibly group of storage allocation units. The temperature metric is a single number intended to predict the amount of future activity on that storage allocation unit or group of storage allocation units. The set of temperature metrics as viewed across all storage allocation units is sorted from highest to lowest temperature value, and this ordering of temperature metrics allows the storage subsystem to determine which storage allocation units to place in faster storage, and which can be placed in slower storage, to achieve the best performance of the system given its resource constraints. In addition to an ordering, the actual values of the temperature metrics in combination with the cost of data movement can be used to prioritize movement of data within the storage subsystem from one tier to another (and within a tier for those tiers with location-sensitive performance).

In some cases the single data temperature model can be used to optimize placement on multiple tiers of the storage subsystem, or to optimize a feature provided by the storage subsystem. For example, automatic temperature-based compression of data can reduce the storage requirement of a system by compressing data which is seldom accessed. By only compressing the coldest data, overall system performance is not degraded significantly by the compression/decompression activity. Storage subsystems which do not exact a performance penalty for writes versus reads (i.e., read-write neutral) can share a single temperature model with an automatic compression feature without compromising the storage subsystem performance.

However, there are other situations in which utilization of a single data temperature model results in inferior data management by the storage subsystem. An example of this is Read-Intensive Solid-State Disk (RISSD) storage. Adding RISSD as an additional storage tier prevents the sharing of a single temperature model for multiple purposes, because RISSD devices carry a large performance penalty for writes. The temperature model providing the optimal workload for the RISSD tier would produce an ordering of storage allocation units minimizing the number of writes and would not necessarily count reads at all. But if there is also a need to choose which allocation units to compress based on temperature, the RISSD model is not appropriate. Data compression will incur a performance penalty every time the data is read, and the RISSD temperature model will not assign a high temperature to data which is read frequently but written infrequently. This will result in unwanted compression of data which is accessed frequently, causing the storage subsystem to perform poorly. Alternatively, if a read-write neutral temperature model is used to benefit the automatic compression feature, the storage subsystem may not place data with high read temperature and low write temperature into the RISSD tier and instead leave it in the more expensive high-performance Solid-State Drive (SSD) tier. Such data will consume a limited resource unnecessarily, preventing a better use of that SSD tier resource by data that could benefit from it. This will also result in suboptimal storage subsystem performance.

Storage management decisions are driven by the set of data temperature metrics produced for each storage allocation unit by the underlying data temperature model. A single data temperature model can and does cause inferior storage access performance when optimal placement on the storage tiers does not fit the temperature model, or when another feature provided by the storage subsystem cannot be accurately represented by the temperature model. Currently, decisions regarding placement of data for a storage subsystem having heterogenous storage tiers and supporting other performance optimization features such as compression is based on a single-dimensional data temperature model, which may provide optimal placement on some of the storage tiers but is inferior for other storage tiers or for providing other features.

SUMMARY

In various embodiments, methods and a system for managing storage with multiple simultaneous data temperature models are provided.

In one aspect provided herein, a method for managing storage with multiple simultaneous data temperature generators is provided. A mapping is maintained between storage management features and dimensions that are associated with locations of data temperatures for data storage housed on storage allocation units. A unique one of the locations is assigned to each of a plurality of data temperature generators and each data temperature generator is instructed to store calculated data temperatures in a corresponding location within a temperature storage. A storage allocation unit identifier and a selected storage management feature are received. A select dimension is obtained by accessing the mapping with the selected storage management feature. A current data temperature is acquired for the data storage by accessing the temperature storage using the storage allocation unit identifier and the select dimension. The current data temperature is provided to at least one storage management process for managing the data storage based on the current data temperature.

DETAILED DESCRIPTION

Figure 1:
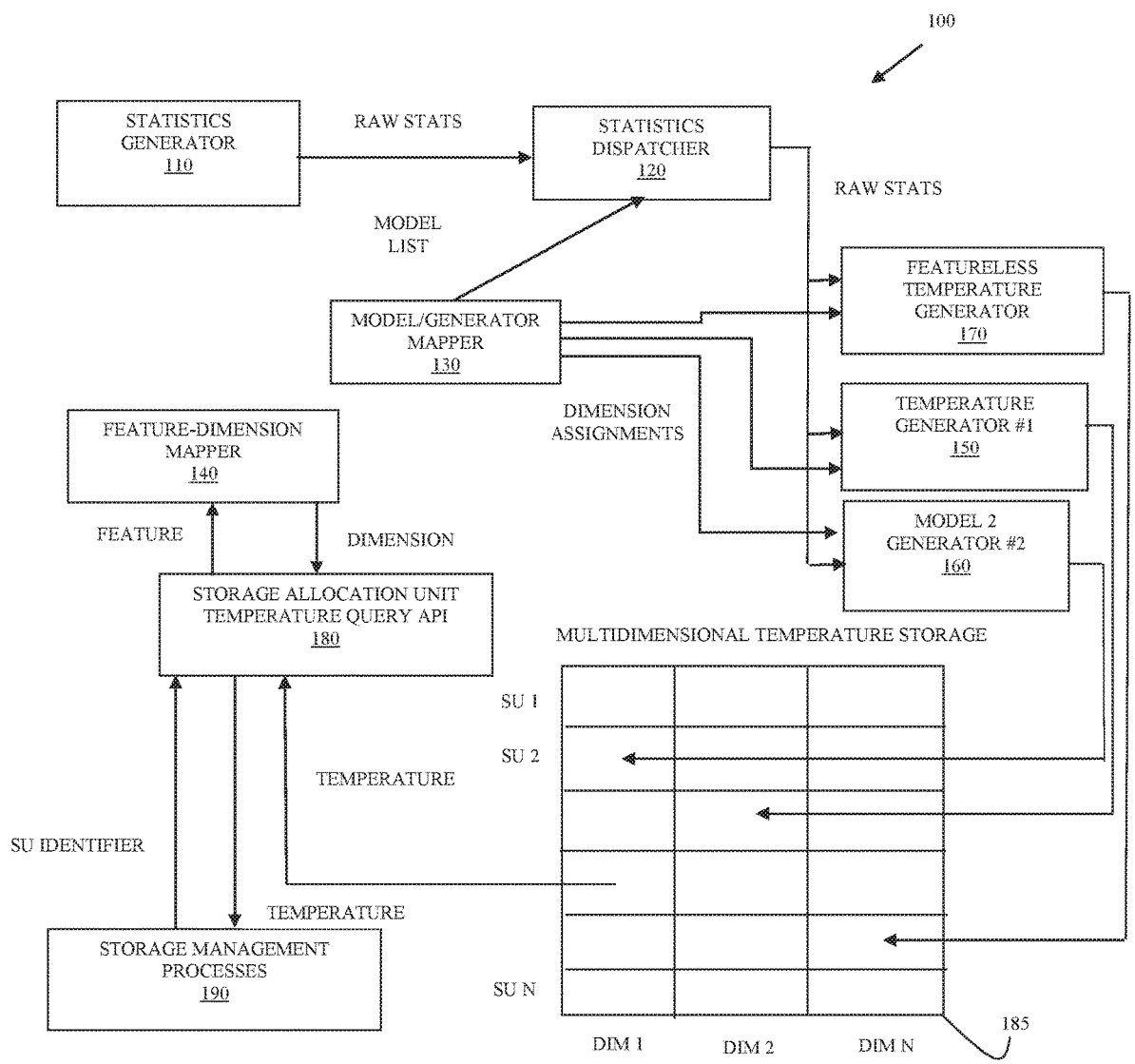
FIG. 1 is a diagram of a system for managing storage with multiple simultaneous data temperature models, according to an embodiment.

FIG. 1 is a diagram of a system 100 for managing storage with multiple simultaneous data temperature models, according to an embodiment. The system 100 is shown in greatly simplified form with just those components necessary for understanding the teachings of managing storage with multiple simultaneous data temperature models being illustrated. It is to be noted that a variety of other components or fewer components can be employed without departing from the teachings of managing storage with multiple simultaneous data temperature models presented herein and below.

The system 100 includes: a statistics generator 110, a statistics dispatcher 120, a model mapper 130, a feature-dimension mapper 140, a model 1 temperature generator 150, a model 2 temperature generator 160, a featureless model temperature generator 170, a storage unit temperature query Application Programming Interface (API) 180, a multidimensional temperature storage/data structure 185, and a plurality of storage management processes 190.

As used herein, the terms and phrases "database," "DBMS," "data store," and "data warehouse" may be used interchangeably and synonymously. That is, a data warehouse may be viewed as a collection of databases or a collection of data from diverse and different data source systems that provides a centralized access and federated view of the data from the different data source systems/environments through the data warehouse (may be referred to as just "warehouse"). The DBMS includes a variety of database tools/interfaces and operations to manage and provide database services. So, each data source system/environment cooperates to logically represent a single data warehouse that includes distributed and replicated data over one or more network connections utilizing the data store's tools/interfaces, APIs, and operations.

A "storage allocation unit" refers to a subset of the storage defined and managed by underlying storage subsystems of the data warehouse. The storage subsystems include storage physically residing on different types of storage devices. The types of storage devices can include, by way of example, HDDs, RISSDs, and SSDs. The storage devices are managed in sets of storage devices, each set referred to as a storage tier. Within a single storage tier, the underlying storage devices are homogenous and of the same storage device type. However, between storage tiers, the storage devices may be heterogeneous having different storage device types from one tier to another tier.

As used herein a data temperature "generator" refers to a specific algorithm or set of calculations that take as input I/O or other activity statistics for storage allocation units and produce as output a data temperature metric/value. Each data temperature generator may also refer to a data temperature model because each is customized with a unique set of calculations to take specific I/O or other activity statistics and produce a single outputted data temperature metric/value. Each data temperature generator is a model for measuring or weighting a storage allocation unit for a specific data management feature (discussed below).

A "data temperature metric/value" refers to a computed or calculated value produced by a temperature generator for a storage allocation unit. As discussed above, and conventionally, temperature generators/models are single dimensional meaning a single data temperature metric for each storage allocation unit is used to direct data placement across all storage tiers and to control other storage subsystem decisions made on behalf of that storage allocation unit. This is changed with the teachings provided herein, and a single storage allocation unit can be assigned a plurality of data temperature metrics/values (hereinafter just "data temperature") with each data temperature produced by a different temperature generator/model designed and optimized for placement on a particular set of storage tiers or for optimal operation of a particular feature provided by the storage subsystem. In this way, the data temperature becomes multidimensional, which allows the underlying storage subsystem to optimally manage storage allocation and placement within the underlying storage devices as well as additional storage subsystem features, resulting in optimal storage access performance by the DBMS.

As will be demonstrated herein, by allowing more than one temperature generator/model to be active simultaneously within the storage subsystem, there is no need for any compromising, which were discussed above. Each storage subsystem feature such as: optimal placement, caching, and automatic compression can choose the appropriate temperature generator/model for its optimal operation. The optimal placement feature may combine the output from more than one temperature generator/model in order to optimize its operation, especially when the storage subsystem contains three or more tiers of storage. For example, if there is a high performance SSD, a RISSD, and an HDD tier the optimal placement feature can compare expected RISSD performance on writes vs. expected overall HDD performance on combined reads and writes.

Raw statistics for accesses to data by the DBMS is collected by the statistics generator 110 from low level Input/Output ("I/O") components of the storage subsystems. These components can include, by way of example only, storage device drivers, memory cache managers, network device drivers, and specialty or generic kernel modules. The statistics collected are related to system activities performed on behalf of each storage allocation unit. These statistics may be associated with a single activity or aggregated among multiple instances of the same activity. Each set of statistics is tagged to identify the particular storage allocation unit involved. Each of the components involved in this process are statistics generators that comprise the statistics generator 110 illustrated in the FIG. 1.

The statistics dispatcher 120 accepts sets of statistics from the statistics generators 110 and optionally may consolidate, combine, or otherwise manipulate the statistics it receives. The dispatcher 120 then accepts a list of active temperature models from the model mapper 130 and forwards the statistics to each active temperature generator/model (150, 160, and 170 in the FIG. 1).

Each temperature model (150, 160, and 170) extracts only those statistics which are relevant to that generator's/model's underlying calculations and each model (150, 160, and 170) uses the filtered statistics as input along with the storage allocation unit identifier to update the persistent temperature storage (multidimensional temperature storage 185). Each storage allocation unit has an assigned slot within the persistent temperature storage, wherein the data temperature for that unit is stored. There is a one-to-one mapping between storage allocation units and temperature storage slots. Optionally, an individual temperature generator/model may instead use the statistics to update its own private storage (persistent or not) and perform asynchronous updates to the persistent temperature storage using the data in its private storage. This allows the passage of time to influence the behavior of the temperature generators/models (150, 160, and 170).

Each persistent temperature storage slot contains one temperature metric for each active temperature model (150, 160, and 170). Each model (150, 160, and 170) is assigned a dimension, effectively a small integer indicating which of the slot's temperature metrics the model is to use; the slot maps to a location within the multidimensional temperature storage 185. Temperature models (150, 160, and 170) determine their assigned dimension (location within 185) via lookup in the model/generator mapper 130 and are responsible for maintaining each storage allocation unit's temperature metric within that dimension of 185. The model/generator mapper 130 allows for as many temperature generators/models to exist as is permitted within the persistent temperature storage 185 (number of dimensions N of 185 as illustrated in FIG. 1). When a preset size of storage 185 is changed or enhanced for the warehouse to a larger storage or data structure, the model/generator mapper 130 can permit N dimensions (model mappers) for N data temperatures on a single storage allocation unit. The output of each generator/model (150, 160, and 170) is a single temperature metric (data temperature) per storage allocation unit, expressed in units specific to each generator/model (150, 160, and 170).

Feature-dimension mapper 140 allows for the flexibility to dynamically switch models due to changing conditions and underlying system workload requirements of the DBMS. The feature-dimension mapper 140 associates each feature (data placement, automatic compression, caching, etc.) with one or more of the generators/models (150, 160, and 170). Altering the dimension used by a particular feature for managing storage allocation units will automatically and instantaneously change the data temperature by switching to the appropriate model's calculated data temperature from the multidimensional temperature storage 185. This allows individual features to quickly adjust their behavior based on some external event. This event could be a manual change made by an administrator or an automated change made by a workload manager. Possible applications include adjusting behavior for anticipated workload differences for particular days of the week, month-end or quarterly reporting and the like. In general, if N different behaviors are desired for a feature, there will be N temperature dimensions allocated to that feature in the model/generator mapper 130 and N different temperature generators/models. Of those N dimensions, only one will affect the feature's behavior at any given point in time but all N are maintained at all times and ready to be activated The storage unit temperature query API 180 permits plug-and-play insertion of the multidimensional approach into the DBMS. A desired feature (optimized by a particular one of the model mappers (150, 160, and 170) can be dynamically switched manually or automatically based on evaluation of current performance of the DBMS. That feature is passed to the feature-dimension mapper 140, which returns the dimension or location within the multidimensional temperature storage 185 for obtaining a particular storage unit's (provided as input) data temperature associated with the desired feature. The storage unit's data temperature for the desired feature is obtained from 185 and passed by the storage unit temperature query API 180 to the underlying storage management processes 190, which automatically drives changes in the placement and organization of the data by the storage subsystems associated with that storage allocation unit based on the returned data temperature (optimized for the desired feature).

Having active multidimensional data temperatures for a single storage allocation unit allows for dynamic optimization by the underlying storage management processes 190 and storage subsystems. This can permit a variety of beneficial results, such as and by way of example only:
1. Optimizing data placement on read-intensive SSD devices while simultaneously supporting in-memory caching of frequently accessed data.
2. Optimizing usage of storage systems containing more than two tiers of storage, such as high performance SSD+RISSD+HDD.
3. Altering the behavior of individual storage features such as in-memory caching based on a calendar schedule so as to optimize the performance of specific calendar-based workloads.
4. Altering the behavior of individual storage features based on hints from external workload management components in order to tailor system characteristics to perform best on prioritized workloads, The above-referenced embodiments and other embodiments will now be discussed with reference to the FIGS. 2-4.

Figure 2:
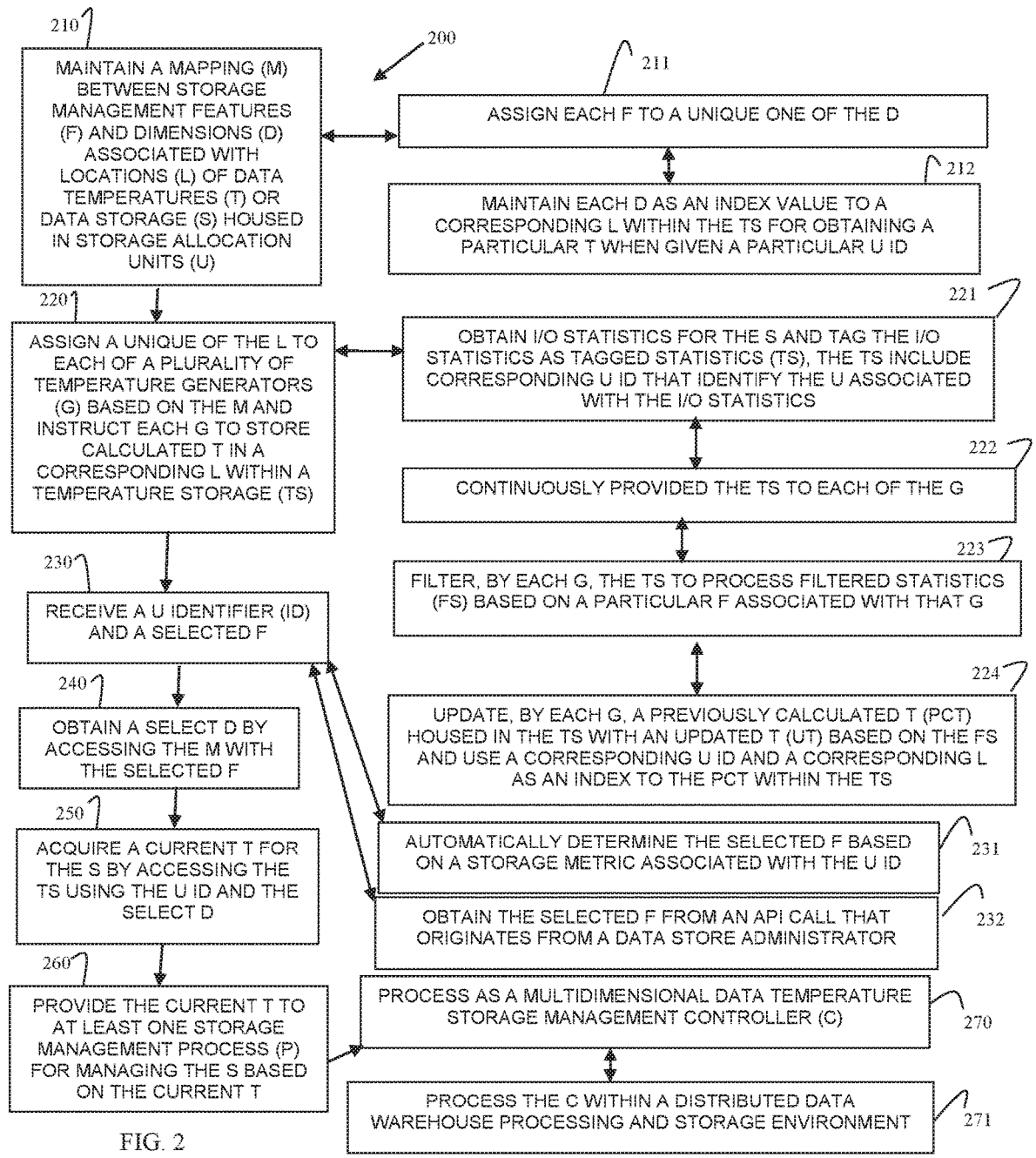
FIG. 2 is a diagram of a method for managing storage with multiple simultaneous data temperature models, according to an example embodiment.

FIG. 2 is a diagram of a method 200 for managing storage with multiple simultaneous data temperature models, according to an example embodiment. The method 200 is implemented as one or more software modules referred to as a "data temperature dimension selector"). The data temperature dimension selector represents executable instructions that are programmed within memory or a non-transitory computer-readable medium and executed by one or more hardware processors of one or more devices. The data temperature dimension selector may have access to one or more network connections during processing, which can be wired, wireless, or a combination of wired and wireless.

In an embodiment, the data temperature dimension selector executes on server.

In an embodiment, the data temperature dimension selector is the generator/model mapper 130, the feature-dimension mapper 140, and/or the storage unit temperature query API 180.

At 210, the data temperature dimension selector maintains a mapping between storage management features and dimensions associated with locations of data temperatures housed in storage allocation units of a distributed data store.

In an embodiment, at 211, the data temperature dimension selector assigns each storage management feature to a unique one of the dimensions. That is, there is a one-to-one mapping between the dimensions and the storage management features.

In an embodiment, the storage management features include: data storage arrangement/placement/organization within the underlying storage devices of the storage allocation units; data caching, and data compression.

In an embodiment of 211 and at 212, the data temperature dimension selector maintains each dimension as an index value to a corresponding location within a temperature storage or data structure. In an embodiment, the temperature storage or data structure is the multidimensional temperature storage 185.

In an embodiment, the processing at 210 is performed by the feature-dimension mapper 140.

At 220, the data temperature dimension selector assigns a unique one of the locations to each of a plurality of temperature generators/models based on the mapping. The data temperature dimension selector also instructs each of the temperature generators/models to store calculated data temperatures in a corresponding location within the temperature storage.

In an embodiment, the processing of 220 is performed by the model mapper 130.

In an embodiment, at 221, the data temperature dimension selector obtains I/O statistics for the data storage and tags the I/O statistics, creating tagged statistics. The tagged statistics include corresponding storage allocation unit identifiers to identify the storage allocation units that produced or associated with the I/O statistics.

In an embodiment of 221 and at 222, the data temperature dimension selector continuously provides the tagged statistics to each of the data temperature generators/models. This can also be configured to be done at predefined intervals of time or upon detection of an event or a condition.

In an embodiment of 222 and at 223, each data temperature generator/model filters the tagged statistics to process a filtered version of the tagged statistics as filtered statistics based on a particular storage management feature that is associated with that data temperature generator/model.

In an embodiment of 223 and at 224, each data temperature generator/model updates a previously calculated data temperature housed in the temperature storage with an updated data temperature based on the filtered statistics. Each data temperature generator/model then uses a corresponding storage allocation unit identifier and corresponding location as an index to the previously calculated data temperature within the temperature storage to replace the previously calculated data temperature with the updated data temperature.

At 230, the data temperature dimension selector receives a storage allocation unit identifier and a selected storage management feature.

In an embodiment, at 231, the data temperature dimension selector automatically determines the selected storage management feature based on a storage metric associated with the storage allocation unit identifier.

In an embodiment, at 232, the data temperature dimension selector obtains the selected storage management feature from an API call that originates from a data store administrator.

At 240, the data temperature dimension selector obtains a select dimension by accessing the mapping from 210 with the selected management feature.

At 250, the data temperature dimension selector acquires a current data temperature for the data storage by accessing the temperature storage using the storage allocation unit identifier and the select dimension, At 260, the data temperature dimension selector provides the current data temperature to at least one storage management process for managing, modifying, or changing the storage based on the current data temperature.

In an embodiment, at 270, the data temperature dimension selector is processed as a multidimensional data temperature storage management controller.

In an embodiment of 270 and at 271, the controller is processed within a distributed data warehouse processing and storage environment for purposes of dynamically managing storage of the storage allocation units based on one of a plurality of current and available different data temperatures, each data temperature reflecting a metric that measures performance of a given storage management feature of the warehouse.

Figure 3:
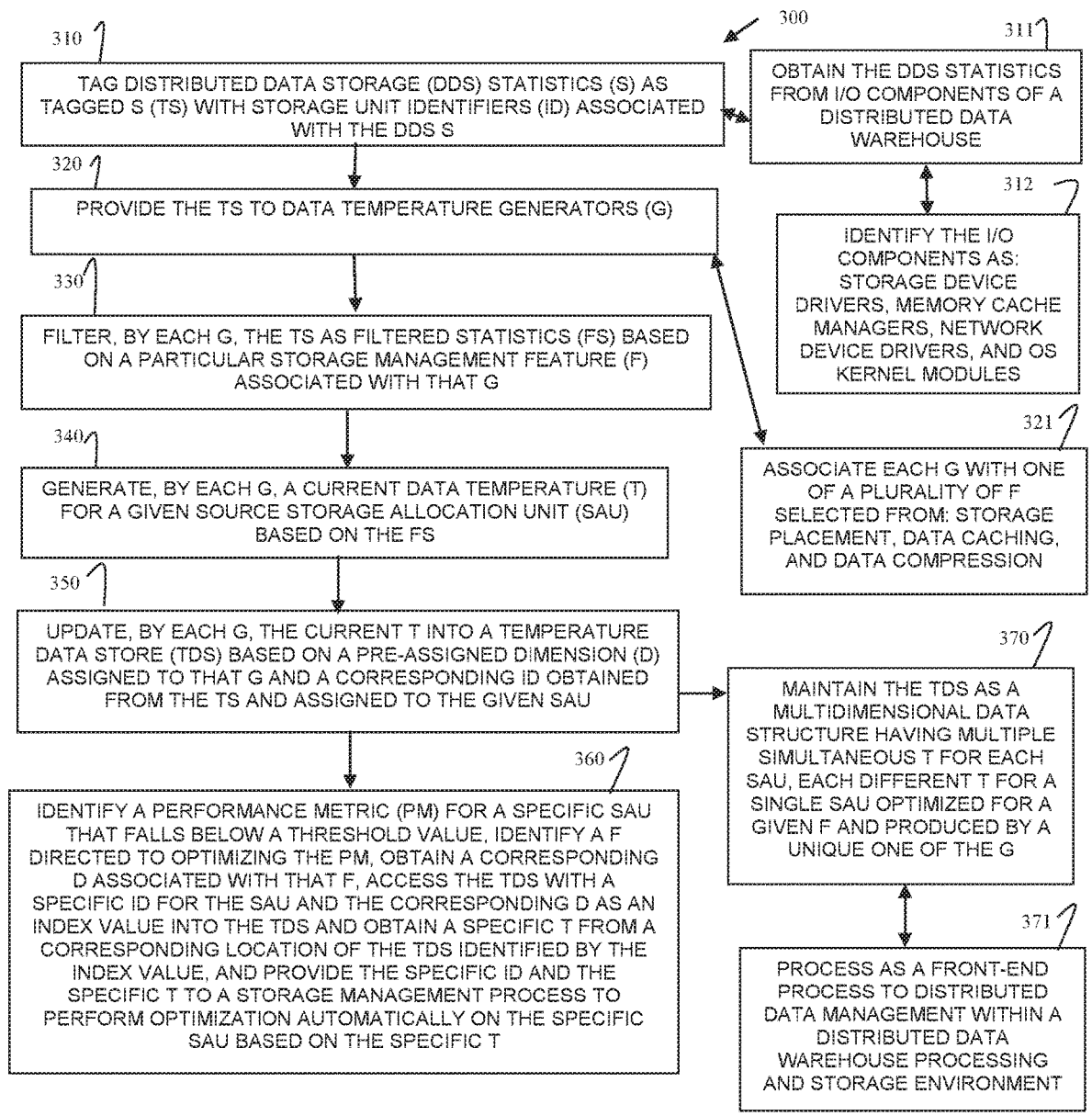
FIG. 3 is a diagram of another method for managing storage with multiple simultaneous data temperature models, according to an example embodiment.

FIG. 3 is a diagram of another method 300 for managing storage with multiple simultaneous data temperature models, according to an embodiment. The method 300 is implemented as one or more software modules referred to as a "data temperature manager." The data temperature manager represents executable instructions that are programmed within memory or a non-transitory computer-readable medium and executed by one or more hardware processors of a device. The data temperature manager may have access to one or more network connections during processing, which can be wired, wireless, or a combination of wired and wireless.

The processing depicted for the data temperature manager in the FIG. 3 presents another and, in some ways, enhanced perspective of the processing discussed above with the FIGS. 1 and 2.

In an embodiment, the data temperature manager is all of or any combination of: the model mapper 130, the feature-dimension mapper 140, the storage unit temperature query API 180, and/or the method 200.

At 310, the data temperature manager tags distributed data storage statistics as tagged statistics with storage unit identifiers associated with the distributed data storage statistics. So, each statistic includes a tag for its source storage allocation unit.

In an embodiment, at 311, the data temperature manager obtains the distributed storage statistics from I/O components of a distributed data warehouse.

In an embodiment of 311 and at 312, the data temperature manager identifies the I/O components as: storage device drivers, memory cache managers, network device drivers, and Operating System (OS) kernel modules.

At 320, the data temperature manager provides the tagged statistics to data temperature generators/model, each data temperature generator/model customized to produce a data storage metric (data temperature) for the data storage based on a specific storage management feature.

In an embodiment, at 321 the data temperature manager associated each data temperature generator/model with one of a plurality of storage management features selected from: storage placement/organization, data caching, and data compression.

At 330, each data temperature generator/model filters the tagged statistics as filtered statistics based on a particular storage management feature associated with that data temperature generator/model.

At 340, each data temperature generator/model generates a current data temperature for a given source storage allocation unit based on the filtered statistics and the customized calculations associated with that data temperature generator's/model's storage management feature that is being measured.

At 350, each data temperature generator/model updates the current data temperature into a temperature data store based on a pre-assigned dimension assigned to that generator/model and a corresponding storage allocation unit identifier obtained from the tagged statistics and assigned to the given storage allocation unit.

In this way, the data temperature for any given storage allocation unit is up-to-date and current. Moreover, each storage allocation unit has multiple different data temperatures (multidimensional), each temperature is produced to measure performance of a specific storage management feature. At any given point in time, optimization of the storage allocation unit can be dynamically switched to provide optimization for any desired storage management feature. The underlying storage management processes and storage subsystems when provided a specific data temperature will automatically perform data management to optimize the data for placement, organization, caching, and/or compression based on the supplied data temperature.

In an embodiment, at 360, the data temperature manager identifies a performance metric for a specific storage allocation unit that falls below a threshold value. The data temperature manager identifies a feature that is directed to optimizing the performance metric and obtains a corresponding dimension associated with that feature. Next, the data temperature manager accesses the temperature data store with the specific storage allocation unit identifier for the storage allocation unit and the corresponding dimension as an index value into the temperature data store, and the data temperature manager obtains a specific data temperature from the corresponding location of the temperature data store identified by the index value. The data temperature manager, then, provides the specific storage allocation unit identifier and the specific data temperature to at least one storage management process. The storage management processing then automatically performs optimization on the storage of the specific storage allocation unit based on the specific data temperature.

In an embodiment, at 370, the data temperature manager maintains the temperature data store as a multidimensional data temperature data structure having multiple simultaneous data temperature for each single storage allocation unit. Each different data temperature for a single storage allocation unit is optimized for a given storage management feature and is produced by a unique one of the temperature generators/models.

In an embodiment of 370 and at 371, the data temperature manager is processed as a front-end process to distributed data management within a distributed data warehouse processing and storage environment.

Figure 4:
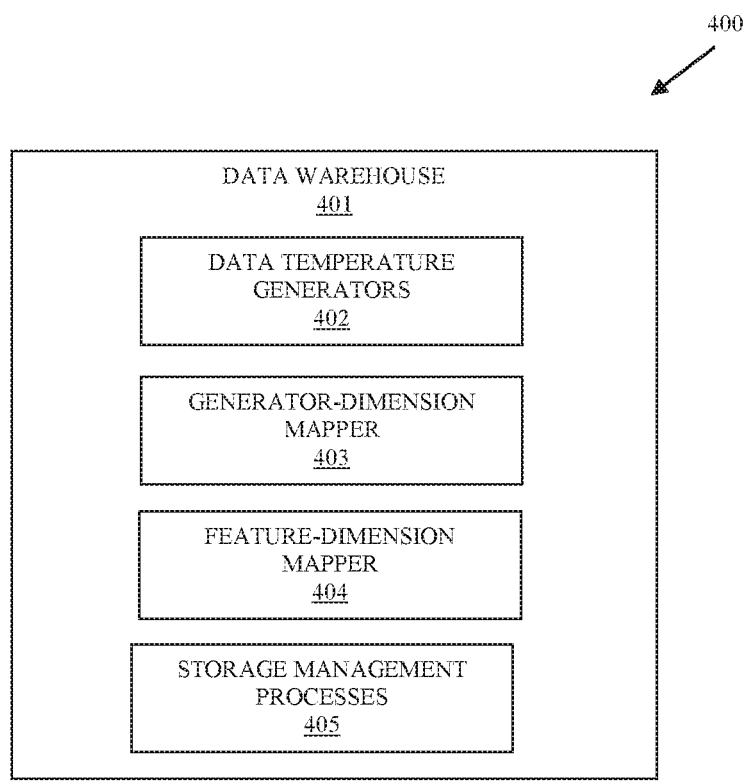
FIG. 4 is a diagram of a data warehouse for managing storage with multiple simultaneous data temperature models, according to an example embodiment.

FIG. 4 is a diagram of a data warehouse 400 for managing storage with multiple simultaneous data temperature models, according to an example embodiment. The data warehouse 400 includes a variety of hardware components and software components. The software components are programmed as executable instructions into memory and/or a non-transitory computer-readable medium for execution on the hardware components (hardware processors). The system 400 includes one or more network connections; the networks can be wired, wireless, or a combination of wired and wireless.

The data warehouse 400 implements, inter alia, the processing discussed above with the FIGS. 1-3.

The data warehouse 400 includes: a plurality of data temperature generators/models 402, a generator/model-dimension mapper 403, a feature-dimension mapper 404, and a plurality of storage management processes 405.

The data warehouse 400 includes a plurality of computing devices and storage devices having storage accessible over a network (wired and/or wireless) for accessing data organized and stored in the storage by services and interfaces of the data warehouse 400.

One of more of the computing devices include one or more processors and non-transitory computer-readable media having executable instructions. The executable instructions when executed by the processors from the non-transitory computer-readable storage media cause the processors to perform the processing discussed below for the data temperature generators/models 402, the generator/model-dimension mapper 403, the feature-dimension mapper 404, and the storage management processes.

In an embodiment, the data temperature generators/models 402, the generator/model-dimension mapper 403, and the feature-dimension mapper 402 are all of or some combination of: the model 1 temperature generator 150, the model 2 temperature generator 160, the featureless model temperature generator 170, the model mapper 130, the feature-dimension mapper 140, the storage unit temperature query API 180, the storage management processes 190, the method 200, and/or the method 300.

When the executable instructions associated with the feature-dimension mapper 404 are executed by the processors of the computing devices from the non-transitory computer-readable storage media, the processors perform processing to: return a dimension associated with an entry within a temperature storage based on a given storage management feature.

When the executable instructions associated with the generator-dimension mapper 403 are executed by the processors of the computing devices from the non-transitory computer-readable storage media, the processors perform processing to: assign each of the data temperature generators 402 a unique dimension based on a given storage management feature.

When the executable instructions associated with the data temperature generators 402 are executed by the processors of the computing devices from the non-transitory computer-readable storage media, the processors perform processing for each data temperature generator 402 to: filter data storage statistics for feature-based statistics that are specific to the given storage management feature associated with that data temperature generator 402; and update a pre-existing data temperature within the temperature data store with a current data temperature based on processing a filtered version of the data storage statistics at a location within the temperature data store identified by the corresponding dimension assigned by the generator-dimension mapper 403 and identified by a given storage allocation unit identifier.

When the executable instructions associated with the storage management processes 405 are executed by the processors of the computing devices from the non-transitory computer-readable storage media, the processors perform processing for each storage management process 405 to: automatically perform storage optimization processing based on a supplied data temperature obtained from the temperature data store.

In an embodiment, each data temperature generator 402 is customized to generate a specific data temperature associated with identifying storage performance of the distributed data warehouse 400 based on a specific storage management feature.

In an embodiment, the storage management features are selected from: caching, storage data placement or arrangement on the underlying storage devices, and storage data compression.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
maintaining a mapping between storage management features and dimensions that are associated with locations of data temperatures for data storage housed on storage allocation units;
assigning a unique one of the locations to each of a plurality of data temperature generators based on the mapping and instructing each data temperature generator to store calculated data temperatures in a corresponding location within a temperature storage;
receiving a storage allocation unit identifier and a selected storage management feature;
obtaining a select dimension by accessing the mapping with the selected storage management feature;
acquiring a current data temperature for the data storage by accessing the temperature storage using the storage allocation unit identifier and the select dimension; and
providing the current data temperature to at least one storage management process for managing the data storage based on the current data temperature.

2. The method of claim 1, wherein maintaining further includes assigning each storage management feature to a unique one of the dimensions.

3. The method of claim 2, wherein assigning further includes maintaining each dimension as an index value to a corresponding location within the temperature storage for obtaining a particular data temperature when given a particular storage allocation unit identifier.

4. The method of claim 1, wherein assigning further includes obtaining Input/Output (I/O) statistics for the data storage and tagging the I/O statistics as tagged I/O statistics, wherein the tagged I/O statistics include corresponding allocation unit identifiers that identify the storage allocation units associated with the I/O statistics.

5. The method of claim 4, wherein obtaining further includes continuously providing the tagged I/O statistics to each of the temperature generators.

6. The method of claim 5, wherein continuously providing further includes filtering, by each temperature generator, the tagged I/O statistics to process filtered statistics based on a particular storage management feature associated with that temperature generator.

7. The method of claim 6, wherein filtering further includes updating, by each temperature generator, a previously calculated data temperature housed in the temperature storage with an updated data temperature based on the filtered statistics and using a corresponding allocation unit identifier and a corresponding location as an index to the previously calculated data temperature within the temperature storage.

8. The method of claim 1, wherein receiving further includes automatically determining the selected management feature based on a storage metric associated with the storage allocation unit identifier.

9. The method of claim 1, wherein receiving further includes obtaining the selected management feature from an Application Programming Interface (API) call that originates from a data store administrator.

10. The method of claim 1 further comprising, processing the method as a multidimensional data temperature storage management controller.

11. The method of claim 10 further comprising, processing the multidimensional data temperature storage management controller within a distributed data warehouse processing and storage environment.

12. A method comprising:
tagging distributed data storage statistics as tagged statistics with storage unit identifiers to identify source storage allocation units associated with the distributed data storage statistics;
providing the tagged statistics to data temperature generators;
filtering, by each data temperature generator, the tagged statistics as filtered statistics based on a particular storage management feature associated with that data temperature generator;
generating, by each data temperature generator, a current data temperature for a given source storage allocation unit based on the filtered statistics;
updating, by each data temperature generator, the current data temperature into a temperature data store based on a pre-assigned dimension assigned to that data temperature generator and a corresponding storage unit identifier obtained from the tagged statistics and assigned to the given source storage allocation unit.

13. The method of claim 12, wherein tagging further includes obtaining the data storage statistics from Input/Output (I/O) components of a distributed data warehouse.

14. The method of claim 13, wherein obtaining further includes identifying the I/O components as: storage device drivers, memory cache managers, network device drivers, and Operating System kernel modules.

15. The method of claim 12, wherein providing further includes associating each temperature generator with one of a plurality of storage management features selected from: storage placement, data caching, a data compression.

16. The method of claim 12 further comprising, identifying a performance metric for a specific storage allocation unit that falls below a threshold value, identifying a storage management feature directed to optimizing the performance metric, obtaining a corresponding dimension associated with that storage management feature, accessing the temperature data store with a specific storage allocation unit identifier and the corresponding dimension as an index value into the temperature data store and obtaining a specific data temperature from a corresponding location of the temperature data store identified by the index value, and providing the specific storage allocation unit identifier and the specific data temperature to a storage management process to perform optimization automatically on the specific storage allocation unit based on the specific data temperature.

17. The method of claim 12 further comprising, maintaining the temperature data store as a multidimensional data temperature data structure having multiple simultaneous data temperatures for each storage allocation unit, each different data temperature for a single storage allocation unit optimized for a given storage management feature and produced by a unique one of the temperature generators.

18. The method of claim 17, wherein maintaining further includes processing the method as a front-end process to distributed data management within a distributed data warehouse processing and storage environment.

19. A distributed data warehouse, comprising:
processors;
non-transitory computer-readable storage media comprising executable instructions representing: data temperature generators, a generator-dimension mapper, feature-dimension mapper, and storage management processes;
the feature-dimension mapper when executed by the processors is configured to cause the processors to:
return a dimension associated with an entry within a temperature storage based on a given storage management feature;

the generator-dimension mapper when executed by the processors is configured to cause the processors to:
  assign each of the data temperature generators a unique dimension based on a given storage management feature;
each of the data temperature generators when executed by the processors is configured to cause the processors to:
  filter data storage statistics for feature-based statistics that are specific to the given storage management feature associated with that data temperature generator; and
  update a pre-existing data temperature within the temperature data store with a current data temperature based on processing a filtered version of the data storage statistics at a location within the temperature data store identified by the corresponding dimension assigned by the generator-dimension mapper and identified by a given storage allocation unit identifier; and
the storage management processes configured when executed by the processors to cause the processors to:
  automatically perform storage optimization processing based on a supplied data temperature obtained from the temperature data store.

20. The system of claim 19, wherein each data temperature generator is customized to generate a specific data temperature associated with identifying storage performance of the distributed data warehouse based on a specific storage management feature.

* * * * *